(12) United States Patent
Nakano et al.

(10) Patent No.: US 12,444,923 B2
(45) Date of Patent: Oct. 14, 2025

(54) VEHICLE CONTROL DEVICE

(71) Applicant: Hitachi Astemo, Ltd., Hitachinaka (JP)

(72) Inventors: Hiroshi Nakano, Tokyo (JP);
Nobuyasu Kanekawa, Tokyo (JP);
Takao Fukuda, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 65 days.

(21) Appl. No.: 18/033,577

(22) PCT Filed: Sep. 27, 2021

(86) PCT No.: PCT/JP2021/035444
§ 371 (c)(1),
(2) Date: Apr. 25, 2023

(87) PCT Pub. No.: WO2022/145095
PCT Pub. Date: Jul. 7, 2022

(65) Prior Publication Data
US 2023/0396055 A1 Dec. 7, 2023

(30) Foreign Application Priority Data
Dec. 28, 2020 (JP) .................................. 2020-218803

(51) Int. Cl.
*H02H 5/04* (2006.01)
*B60R 16/023* (2006.01)

(52) U.S. Cl.
CPC .......... *H02H 5/048* (2013.01); *B60R 16/023* (2013.01)

(58) Field of Classification Search
CPC .......... H02H 5/048; H02H 3/087; H02H 7/20; B60R 16/023

(Continued)

(56) References Cited

U.S. PATENT DOCUMENTS

2007/0075584 A1* 4/2007 Moriya ............... H02J 1/14
307/9.1
2007/0103833 A1* 5/2007 Harris .................. H02H 3/445
361/103

(Continued)

FOREIGN PATENT DOCUMENTS

JP 10-285784 A 10/1998
JP 2008-087534 A 4/2008

(Continued)

OTHER PUBLICATIONS

International Search Report, PCT/JP2021/035444, Nov. 9, 2021, 2 pgs.

(Continued)

*Primary Examiner* — Sreeya Sreevatsa
(74) *Attorney, Agent, or Firm* — Volpe Koenig (57) ABSTRACT

A vehicle control device using a semiconductor fuse, and enabling an increase in size of the semiconductor fuse to be suppressed and the occurrence of an abnormal current to be detected early to enable shut off of the abnormal current. The vehicle control device includes a shut-off unit that supplies and shuts off a supply of power to a plurality of load devices; a current detector that detects a current flowing to the plurality of load devices; and a temperature detector that detects the temperature of the shut-off unit. Furthermore, the vehicle control device includes a drive controller that, when the temperature of the shut-off unit detected by the temperature detector exceeds a predetermined value, controls and restricts operation of the load devices for which the priority is low, based on priorities set for each of the plurality of load devices.

14 Claims, 6 Drawing Sheets

(58) Field of Classification Search
USPC .................................................. 361/93.8, 103
See application file for complete search history.

(56) References Cited

U.S. PATENT DOCUMENTS

| | | | | |
|---|---|---|---|---|
| 2009/0080130 A1* | 3/2009 | Hein | ...................... | H02H 3/087 |
| | | | | 361/72 |
| 2011/0198928 A1 | 8/2011 | Lee | | |
| 2012/0235472 A1* | 9/2012 | Aragai | ................... | B60R 16/03 |
| | | | | 307/9.1 |

FOREIGN PATENT DOCUMENTS

| JP | 2010-132502 A | | 6/2010 |
|---|---|---|---|
| JP | 2010132052 A | * | 6/2010 |
| JP | 2012-506231 A | | 3/2012 |
| JP | 2019-041508 A | | 3/2019 |

OTHER PUBLICATIONS

International Preliminary Report on Patentability issued on Jul. 13, 2023 for PCT International Application No. PCT/JP2021/035444.

* cited by examiner

(a) AT LOW TEMPERATURE

FIG. 4B (b) AT HIGH TEMPERATURE

FIG. 5

| DEVICE | PRIORITY |
|---|---|
| HEADLIGHT | ◉ (AT NIGHT) |
| TAILLIGHT | ◉ (AT NIGHT) |
| STOP LIGHT | ◉ |
| SIDE LIGHT | |
| FOG LIGHT | |
| CABIN LIGHT | |
| HAZARD LIGHT | ○ |
| BLOWER MOTOR (AIRCON) | |
| DOOR LOCK | |
| DEFOGGER | |
| POWER WINDOW | |
| WINDSHIELD WIPERS | ◉ (RAINY WEATHER) |
| FUEL PUMP | ◉ |
| ELECTRIC FAN | ○ |
| CELL MOTOR | |
| CAR NAVIGATION | ○ |

VEHICLE CONTROL DEVICE

TECHNICAL FIELD

The present invention relates to a vehicle control device.

BACKGROUND ART

In recent years, the opening and closing of a door, the use of a parking brake, which had been manually performed by an occupant such as the driver of a vehicle or the like, have come to be electrically operated, and many electric actuators have been mounted in vehicles.

As a result, the number of sensors and actuators has increased, the control devices (ECUs) for each of the functions, and the harnesses, have become enormous, which has led to problems with the space, weight, and production man-hours of a vehicle. In addition, the development of the automatic driving function requires high reliability for the vehicle, and when an abnormality occurs in the vehicle, continuous operation until the vehicle enters a safe state is required.

In order to realize such various functions, integrating ECUs that control the various electric actuators is an effective means for reducing the number of ECUs and cutting down on harnesses. Integration allows various sensors and actuators to be accessed directly, and functions can be expanded by centrally controlling these sensors and actuators. Further, if integration is performed for each area of the vehicle, routing of harnesses for the connections to the sensors and actuators can be reduced.

In supplying power to the electric actuators, a fuse is provided to shut off the supply of power in order to prevent the device and the harness from catching fire when an abnormal current flows through the power supply line for a long time. In addition, relays that turn the supply of power to the electric actuators on/off is provided.

Conventionally, these fuses and relays are housed in a power supply unit separate from the ECU. When an abnormal current flows, a conventional fuse is fused by Joule heat to shut off the supply of power. The fuse needs to be replaced in order to recover the power supply. For this reason, the power supply unit is provided in a place that is easily accessed by the user for the sake of easy fuse replacement.

However, the ECU is installed in a place which is difficult for a user to access, and is firmly fastened to protect the electronic components inside the ECU from water droplets and the like. In a case where a fuse or a relay is provided in such an ECU, to performs a replacement, the unit needs to be opened in order to replace the fused fuse.

Therefore, semiconductor fuses, which realize a conventional fuse or relay with a semiconductor transistor have been used. In a semiconductor fuse, the functions of a conventional fusion fuse and relay are realized by a MOS transistor and an arithmetic unit such as a microcomputer. The semiconductor fuse estimates the temperature of the harness from the value of the current flowing to the power supply line, and turns off the MOS transistor when there is a risk of the harness catching fire due to an abnormal current. When the occurrence of an abnormal current is eliminated, the MOS transistor can be turned on again, thereby obviating the need to make a replacement as is the case with a fusion fuse.

However, when the number of actuators supplying power increases, it is necessary to increase the current capacity of the MOS transistor. In addition, the MOS transistor must be made multi-parallel in order to appropriately secure heat dissipation, and there is an increase in costs and in the mounting area of the substrate.

A technique for solving such a problem is disclosed in Patent Literature 1. In a power supply system that supplies power to a plurality of loads according to the technique disclosed in Patent Literature 1, one end of a fuse is connected to a power supply, and the other end of the fuse is connected to a plurality of load devices via a semiconductor switch. The semiconductor device further includes a control device that has a reception unit for receiving an instruction signal to turn on and off the semiconductor switch and that controls the on and off of the plurality of semiconductor switches.

In a case where an instruction signal is received to turn on a plurality of semiconductor switches at the same time, the control device turns on the plurality of semiconductor switches at different timings for turning on the plurality of semiconductor switches.

According to the technique disclosed in Patent Literature 1, because the plurality of semiconductor switches are turned on at different timings, the current flowing to the fuse is dispersed, thus curbing the size of the fuse.

CITATION LIST

Patent Literature

PTL 1: JP 2019-41508 A

SUMMARY OF INVENTION

Technical Problem

However, although the technique disclosed in Patent Literature 1 is effective for reducing the current capacity of a conventional fusion fuse, there is room for further improvement in the following points in a system using a semiconductor fuse.

First, in an in-vehicle system using a semiconductor fuse, it is imperative that a MOS transistor for shutting off the supply of power does not fail. In particular, when the temperature of the MOS transistor becomes high, an allowable current of the MOS transistor becomes small and breakdown easily occurs. In order to prevent the current flowing to the MOS transistor from exceeding the allowable current even in a high-temperature environment, it is necessary to increase the size of the MOS transistor and make the MOS transistor multi-parallel.

In addition, even in a case where a plurality of actuators is connected via one semiconductor fuse, it is necessary to detect and shut off the occurrence of an abnormal current early.

The present invention was conceived of to solve the above-described problems, and an object of the present invention is to realize a vehicle control device using a semiconductor fuse, the vehicle control device enabling an increase in size of the semiconductor fuse to be suppressed and the occurrence of an abnormal current to be detected early to enable shut off of the abnormal current.

Solution to Problem

In order to achieve the above object, the present invention is configured as follows.

A vehicle control device includes a shut-off unit that supplies and shuts off a supply of power to a plurality of load devices; a current detector that detects a current flowing to the plurality of load devices; a temperature detector that detects the temperature of the shut-off unit; and a drive controller that, when the temperature of the shut-off unit detected by the temperature detector exceeds a predetermined value, controls and restricts operation of the load device for which the priority is low, based on priorities set for each of the plurality of load devices.

Advantageous Effects of Invention

A vehicle control device using a semiconductor fuse can be realized, the vehicle control device enabling an increase in size of the semiconductor fuse to be suppressed and the occurrence of an abnormal current to be detected early to enable shut off of the abnormal current.

DESCRIPTION OF EMBODIMENTS

Hereinafter, embodiments of the present invention will be described with reference to the drawings.

EMBODIMENTS

First Embodiment

In a vehicle control device according to a first embodiment of the present invention, an example will be described in which power is supplied to a plurality of electric actuators by a power supply system mounted in a vehicle.

Figure 1:
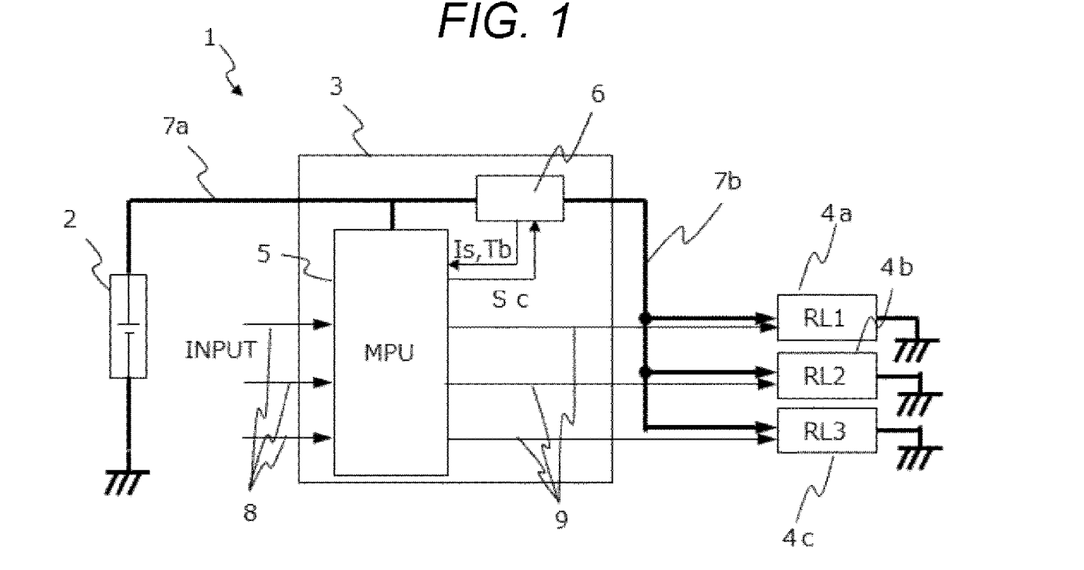
FIG. 1 is a configuration diagram of a vehicle control device to which a first embodiment of the present invention is applied.

FIG. 1 is a schematic configuration diagram of a power supply system 1 to which a vehicle control device according to a first embodiment of the present invention is applied. The power supply system 1 includes a control function for supplying power to a plurality of load devices 4a, 4b, and 4c and issuing operation commands for the plurality of load devices 4a, 4b, and 4c. A power supply system 1 supplies power to a load device such as a light, an air conditioner compressor, a PTC heater, a cooling pump, or a fan. The power supply system 1 includes a battery 2, a control unit 3, and the load devices 4a, 4b, and 4c, which are mounted in a vehicle. The control unit 3 corresponds to a vehicle control device.

As the battery 2, a DC power supply such as a lead battery, a nickel hydrogen battery, or a lithium ion battery mounted in the vehicle is used.

The control unit 3 includes an arithmetic unit 5, a shut-off device (shut-off unit) 6, a primary feeder line 7a, a secondary feeder line 7b, a control input line, and a control output line 8. The power of the battery 2 is supplied to the load devices 4a to 4c via the primary feeder line 7a, the shut-off device 6, and the secondary feeder line 7b. One end of the primary feeder line 7a is connected to the battery 2, while the other end is connected to the shut-off device 6. One end of the secondary feeder line 7b is connected to the shut-off device 6, while the other end is connected to the load devices 4a to 4c. The secondary feeder line 7b is connected in the form of a branch from one shut-off device 6 and is connected to the plurality of load devices 4a to 4c. The shut-off device 6 supplies and shuts off power to the plurality of load devices 4a to 4c.

The control unit 3 is provided with an arithmetic unit (arithmetic and logic unit) 5, receives a control signal from the outside from the control input line 8, and outputs a drive command to the plurality of load devices 4a to 4c according to a processing result inside the arithmetic unit 5. The drive command is outputted via a control output line 9 that connects the arithmetic unit 5 to the load devices 4a to 4c. As the control input line 8, a serial communication-type communication system such as CAN or LIN, or a voltage input system for inputting a voltage change according to the on/off of a switch, or the like, can be used.

Furthermore, as the control output line 9, a serial communication-type communication system such as CAN or LIN, or a voltage output system for outputting a voltage change according to the on/off of driving, or the like, can be used.

In the first embodiment, the example shown in FIG. 1 illustrates a configuration in which the control input line 8 is provided, and the control output line 9 is provided to each of the load devices 4a to 4c, but the configuration may also be such that the control input line 8 and the control output line 9 are connected via a bus by using a serial communication interface.

The arithmetic unit 5 receives a current value Is, which is based on the current flowing to the secondary feeder line 7b, and a shut-off device temperature Tb, which is based on the temperature of the shut-off device 6. Further, the arithmetic unit 5 estimates an overcurrent state of the current flowing to the secondary feeder line 7b, based on the current value Is and the shut-off device temperature Tb. Upon determining that the current flowing to the secondary feeder line 7b is in an overcurrent state, the arithmetic unit 5 outputs a shut-off signal Sc to the shut-off device 6, shuts off the shut-off device 6, and shuts off or restricts the current flowing to the secondary feeder line 7b.

The shut-off device 6 shuts off the current flowing from the battery 2 to the load devices 4a to 4c when the current reaches an abnormal value, and prevents the load devices 4a to 4c and the secondary feeder line 7b from emitting smoke, catching on fire, and failing due to a rise in temperature. The shut-off device 6 is formed of a semiconductor switch such as a MOS transistor.

The shut-off device 6 includes functions of a conventional fuse and a conventional relay. A conventional fuse melts when a current equal to or higher than a rated current flows for a predetermined time. In order to recover the device, it is necessary to respond by replacing the fuse. Even if an abnormal current is generated by forming a shut-off device from a semiconductor switch and the current is shut off, the semiconductor switch can be restored by the signal of the shut-off signal Sc, so that a replacement operation like a conventional fusion fuse is not required.

This eliminates the need to provide a fuse replacement mechanism and facilitates integration of a conventional fuse box into a unit of the vehicle control device.

Figure 2:
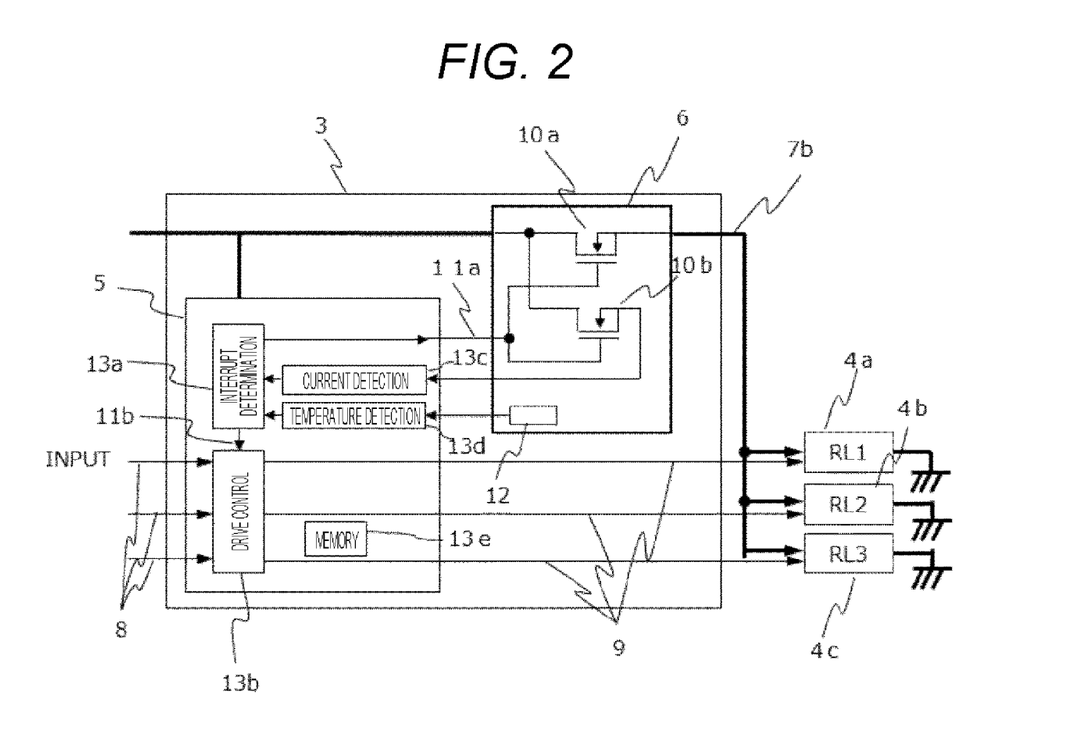
FIG. 2 is a diagram showing a configuration of a vehicle control device according to the first embodiment of the present invention.

FIG. 2 illustrates a specific example using a MOS transistor as the shut-off device 6. The shut-off device 6 includes a source MOSFET 10*a* through which a load current flows and a sensing MOSFET 10*b* that detects a current.

Because the source MOSFET 10*a* and the sensing MOSFET 10*b* are manufactured on the same semiconductor chip in the same process, the matching accuracy of the device is favorable. Therefore, the current flowing to the source MOSFET 10*a* and the sensing MOSFET 10*b* is determined by the ratio of the resistance values. That is, the load current can be detected by detecting the current flowing to the sensing MOSFET 10*b*.

The gate terminal of the source MOSFET 10*a* and the gate terminal of the sensing MOSFET 10*b* are connected to the arithmetic unit 5, and a gate signal 11*a* is supplied thereto. The arithmetic unit 6 uses the gate signal 11*a* to control the on/off of the source MOSFET 10*a* and the sensing MOSFET 10*b*. The current flowing to the sensing MOSFET 10*b* is inputted to the current detector 13*c* of the arithmetic unit 5. Thus, current detector 13*c* detects a current value flowing to the plurality of load devices 4*a* to 4*c*.

In addition, a temperature sensor 12 that detects the temperature of the shut-off device 6 is provided. In addition to a configuration in which the temperature sensor 12 is disposed on the same substrate adjacent to the shut-off device 6, the temperature sensor 12 may be built into the shut-off device 6. The configuration may be such that the temperature sensor 12 is disposed in another part, and the temperature of the shut-off device 6 is estimated from the detected temperature. The temperature sensor 12 is also capable of detecting the temperature of the source MOSFET 10*a*, which is a semiconductor transistor, and of setting the temperature to the temperature of the shut-off device 6. Alternatively, instead of the temperature sensor 12, the potential difference between the drain and the source of the source MOSFET 10*a* may be measured and converted into a temperature.

As the temperature sensor 12, a thermistor, a resistance temperature detector, or the like, can be used. The signal detected by the temperature sensor 12 is inputted to the temperature detector 13*d* of the arithmetic unit 5.

A microprocessor or the like can be used as the arithmetic unit 5. As a function of the arithmetic unit 5, a shut-off determination unit 13*a* is provided to perform a shut-off determination using the current signal and the temperature signal from the shut-off device 6, and the voltage level of the gate signal 11*a* is changed to control the on/off of the source MOSFET 10*a* and the sensing MOSFET 10*b*.

In addition, the shut-off determination unit 13*a* sends a determination value 11*b* to a drive controller 13*b* based on signals from the sensing MOSFET 10*b* and the temperature sensor 12. In accordance with the determination value 11*b* (the determination of whether the predetermined temperature is exceeded), the drive controller 13*b* outputs a drive command or stop command to the load devices 4*a* to 4*c* via the control output line 9 to the load devices 4*a* and 4*b* in response to the drive signal from the control input line 8 and according to the priority rankings of the load devices 4*a* to 4*c*. The drive controller 13*b* controls and restricts the operations of the load devices 4*a* to 4*c*.

Incidentally, a semiconductor transistor such as a MOS transistor is provided as the shut-off device 6, and in order to use the semiconductor transistor, it is necessary to consider allowable characteristics of the semiconductor transistor. In the semiconductor transistor, an allowable current value decreases as the temperature rises. The allowable current value is determined by the junction temperature of the semiconductor, the lifespan required for the device, and so forth.

In particular, because the allowable current value becomes small in a high-temperature state, it is necessary to provide a design such that the sum total of the maximum currents of the respective load devices 4*a* to 4*c* does not exceed the allowable current of the semiconductor element.

However, in rare cases the currents of the plurality of load devices 4*a* to 4*c* simultaneously become maximum values. That is, when the design is created including an event with a very low frequency of occurrence, it is necessary to provide, in parallel, a plurality of MOS transistors as the shut-off device 6, and the component cost increases.

Therefore, in the present invention, the arithmetic unit 5 is provided with the following functions.

The arithmetic unit 5 in the power supply system 1 stores the priority rankings of the plurality of load devices 4*a* to 4*c* in the memory 13*e*, and restricts the starting of load devices having a lower priority ranking when the temperature of the shut-off device 6 exceeds a predetermined value. When the temperature of the shut-off device 6 exceeds a predetermined value, the shut-off threshold value calculated based on the current value and the time is set lower than that at a low temperature.

That is, based on the current detection value detected by the current detector 13*c*, the shut-off device 6 has a first current shut-off threshold value for shutting off power to the plurality of load devices 4*a* to 4*c* and a second current shut-off threshold value smaller than the first current shut-off threshold value. Further, when the temperature detected by the temperature detector 13*c* is equal to or lower than a predetermined value, the first current shut-off threshold value is set, and when the temperature detected by the temperature detector 13*c* exceeds the predetermined value, the second current shut-off threshold value is set.

The above operation will be described with reference to FIG. 3. The shut-off threshold value (at a low temperature) in FIG. 3 indicates the load current and the time until shut-off when the load current flows. The larger the current flowing to the load, such as the inrush current upon starting the load, the shorter the shut-off time is set. The shut-off threshold value indicates the maximum value of the load current when the load devices 4*a* to 4*c* are operating normally (at a low temperature) in FIG. 3, such that the current is shut off when the current flowing to the load devices 4*a* to 4*c* becomes an abnormally high value. The shut-off threshold value is set to a value higher than the load current (at a low temperature) and is set to enable an abnormal overcurrent to be shut off. For example, the shut-off threshold value is set to about 1.3 times the load current.

Figure 3:
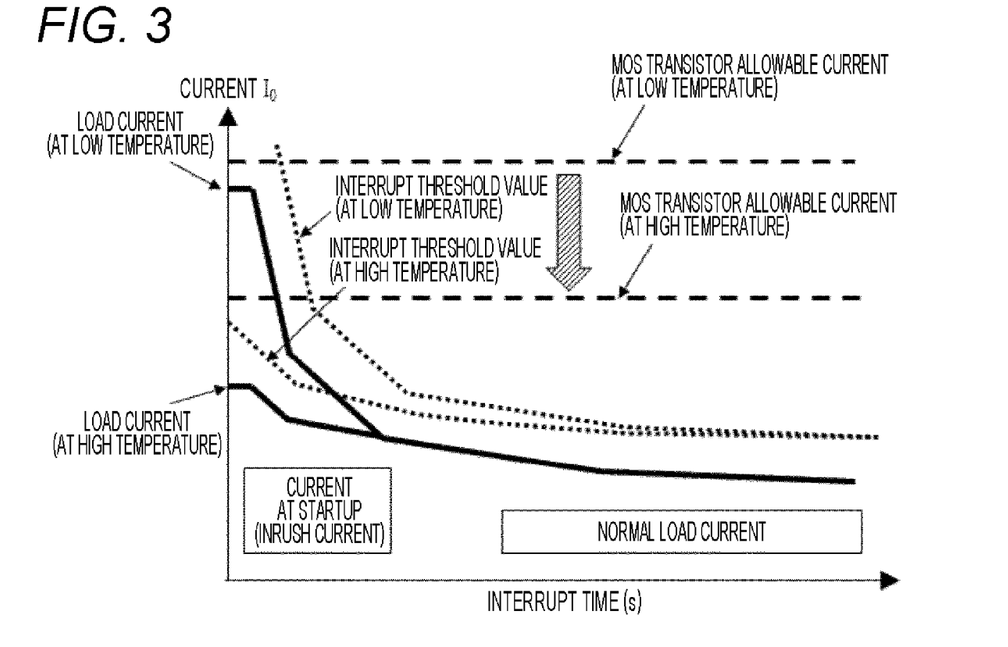
FIG. 3 is a diagram showing the operation of a shut-off device according to the first embodiment of the present invention.

The MOS transistor allowable current (at a low temperature) illustrated in FIG. 3 is a current value allowed for the source MOSFET 10a under a low temperature condition. A standard or the like for the source MOSFET 10a is selected according to the maximum current of the load current (at a low temperature). Under a high temperature condition, the allowable current value of the source MOSFET 10a decreases as indicated by the MOS transistor allowable current (at a high temperature) in FIG. 3. Thus, the load current exceeds the allowable current of the source MOS transistor 10a, and the source MOSFET 10a fails.

In the related art, it is necessary to select a current-sensing MOS transistor including an allowable current in consideration of a high-temperature condition so as not to cause failure of the source MOSFET 10a, or to connect a plurality of current-sensing MOS transistors in parallel, and thus there is a problem that the component cost increases.

In the present invention, as indicated by the load current (at a high temperature) in FIG. 3, when the temperature of the shut-off device 6 rises, the starting of load devices having a low priority ranking is restricted. When the temperature of the shut-off device 6 exceeds a predetermined value, the shut-off threshold value is set lower than that at a low temperature. As a result, the current of the load device can be prevented from exceeding the allowable current of the shut-off device 6 even under a high-temperature condition. Further, because the shut-off threshold value is set lower at a higher temperature than at a low temperature, an abnormal current can be detected and shut off early even in a case where the allowable current of the load device is low. That is, the optimum shut-off threshold value can be set by dynamically changing the shut-off threshold value according to the operation states of the plurality of load devices, and thus an abnormal current can be detected and shut off early.

Next, an example of a method for suppressing the maximum current of the load device when the temperature of the shut-off device 6 rises will be described with reference to FIGS. 4A and 4B.

Figure 4A:
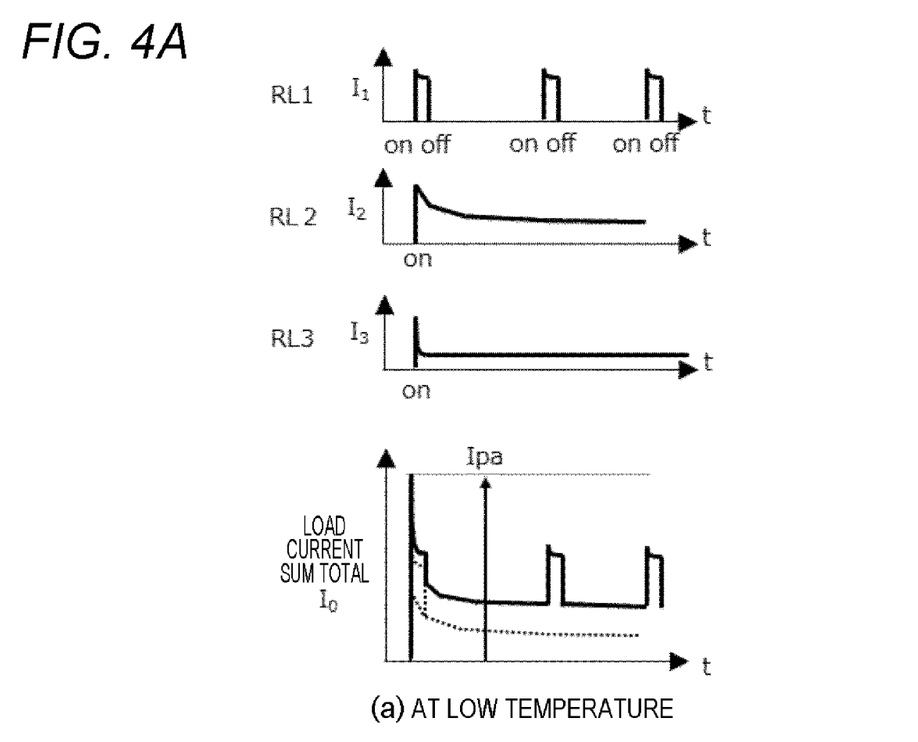
FIG. 4A is a diagram showing operation timings of load devices in an example different from that of the present invention.

FIG. 4A is an example different from the present invention, and is for comparison with the present invention. FIG. 4A illustrates a drive current of the load device when the plurality of load devices are driven at a low temperature and the sum total of the drive currents of the plurality of load devices. The load device RL1 in FIG. 4A is an actuator that operates intermittently, and is, for example, a brake light. The load device RL2 is an actuator in which a current at the time of startup is large, whereupon the current gradually decreases so as to enter a steady state, and is, for example, a heater. The load device RL3 is an actuator through which a large current customarily flows at the time of startup, and is, for example, a fan motor.

At a low temperature, the load devices RL1, RL2, and RL3 are driven in response to drive requests for the load devices RL1, RL2, and RL3 from the control input line 8. When there is an overlap between the timings of the drive requests from the control input line 8, the load devices RL1, RL2, and RL3 are started simultaneously. Accordingly, the current value flowing to the shut-off device 6 becomes the sum Ipa of the inrush currents upon startup of the load devices RL1, RL2, and RL3.

Figure 4B:
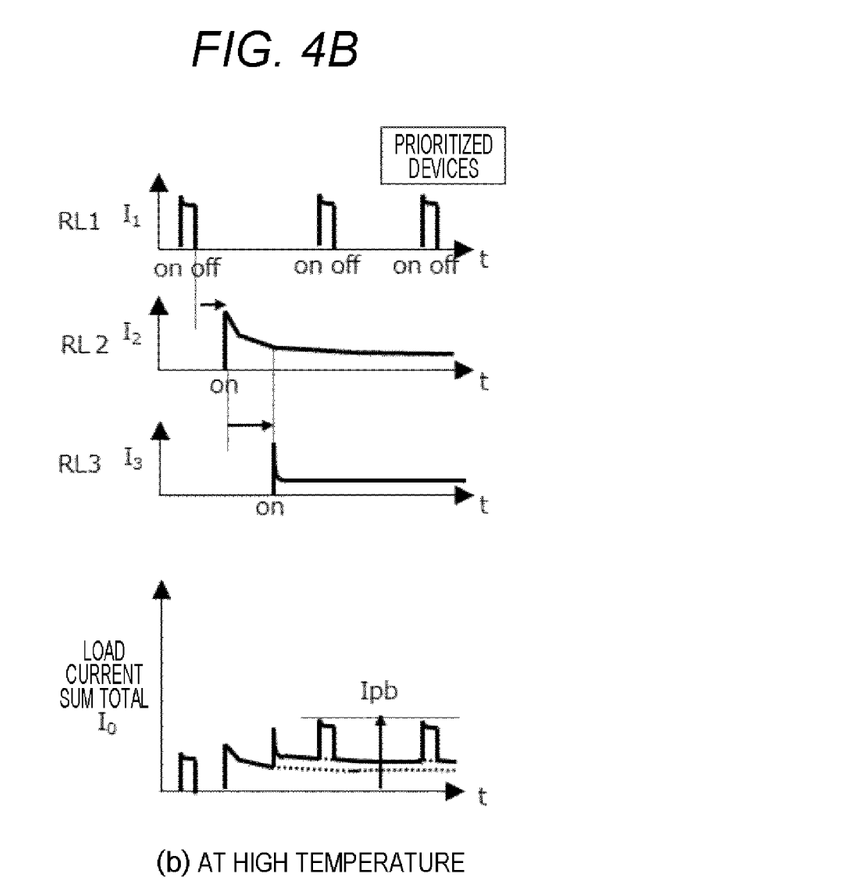
FIG. 4B is a diagram showing operation timings of load devices according to the first embodiment of the present invention.

FIG. 4B illustrates a current flowing to the shut-off device 6 when the first embodiment of the present invention is applied. In FIG. 4B, the load device RL1 is a brake light that needs to be immediately driven in response to a brake operation by the driver, and is a highly prioritized load device. The load devices RL2 and RL3 are in-vehicle cooling devices and in-vehicle air conditioners, and do not need to immediately respond to a startup command. There are prioritized devices such as devices for vehicle travel (drive force, braking force) and safety devices, as opposed to non-prioritized devices, for which the startup timing is not essential, such as air conditioning.

Therefore, in the first embodiment of the present invention, the prioritized devices are immediately driven in response to the drive requests from the control input line 8; however, the non-prioritized device RL2 is started at a staggered time after the prioritized device RL1 is driven. In addition, the non-prioritized device RL3 is started after the non-prioritized device RL2 is driven and the large current upon startup decreases.

That is, when the temperature of the shut-off device 6 exceeds a predetermined value, the drive controller 13b provides a time difference between the startup timings of the plurality of load devices 4a to 4c based on the reduction characteristic of the drive current upon starting each of the plurality of load devices 4a to 4c and the priorities described above.

As a result, the startup timings are scattered, and the peak current Ipb of the sum total of the load currents can be suppressed. In addition, the drive timing is not restricted for essential devices, which are prioritized, and hence safety in vehicle travel can be secured.

Figure 5:
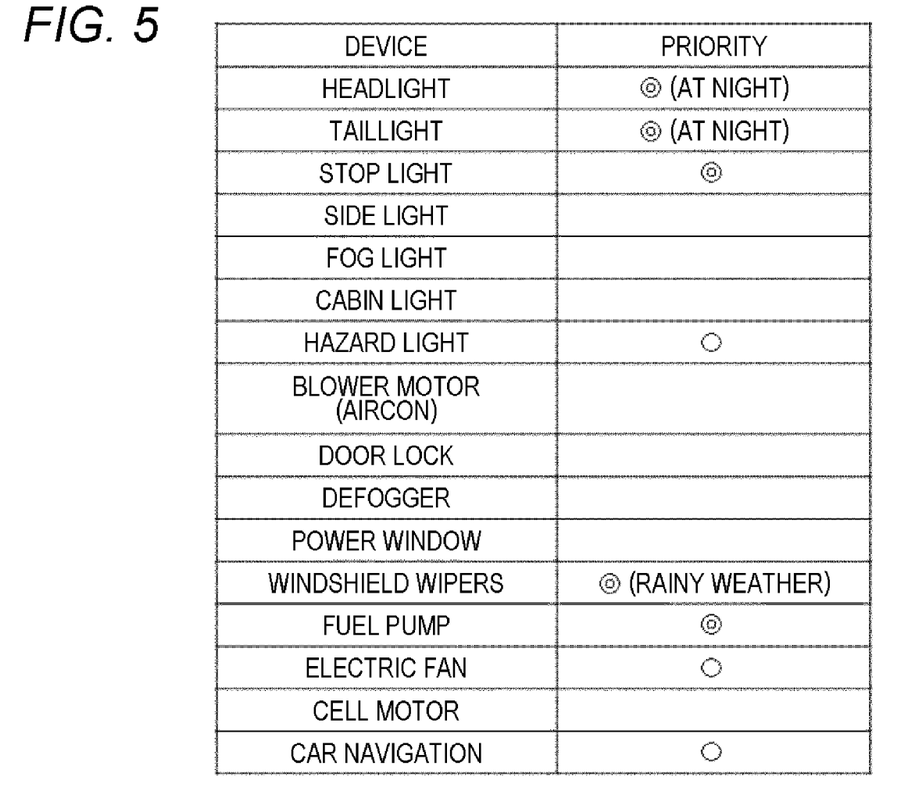
FIG. 5 is a table showing an example of prioritized devices according to the first embodiment of the present invention.

Next, examples of prioritized devices will be described with reference to FIG. 5. FIG. 5 is an example of a device mounted in a vehicle. The devices to be prioritized are, in particular, devices relating to vehicle travel such as a fuel pump of a powertrain system, and safety-related devices such as headlights, stop lights, taillights, and windshield wipers.

Non-prioritized devices are devices that can be substituted for another device such as a side light or a fog light, or devices such as a cooling system or an air-conditioning system that have a small substantial influence even when the startup timing is staggered by around several seconds.

Furthermore, the priorities of the prioritized devices can also be changed according to the travel time, weather, and so forth. For example, the headlights and the taillights are prioritized at night, but the priorities can be lowered in the daytime. In addition, even in the daytime, in an environment akin to nighttime such as a tunnel, the headlights and the taillights are prioritized. Further, the windshield wipers are prioritized when it rains, but the priority can be lowered in a case where it is not raining.

As described above, even in a case where there is a plurality of prioritized devices (load devices), by changing the priority according to the time the vehicle is traveling, the travel environment, and the travel state, the startup timing is scattered further, and hence the peak current required for the power supply can be reduced. In addition, driving of a device that is especially prioritized according to the travel state of the vehicle is not restricted, and hence safety in vehicle travel can be secured.

Figure 6:
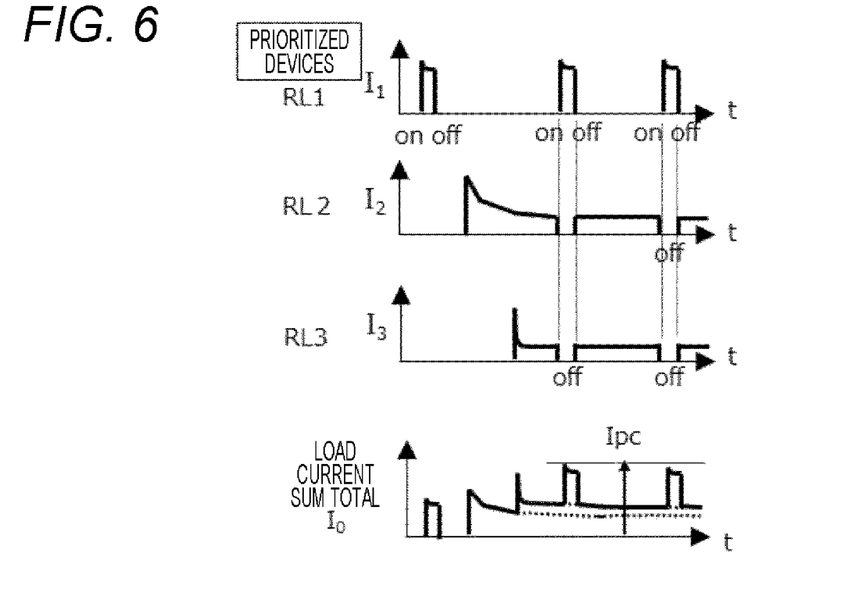
FIG. 6 is a diagram showing a more effective method for the operation timings of the load devices according to the first embodiment of the present invention.

A more effective method for suppressing the peak current will be described with reference to FIG. 6. As illustrated in FIG. 6, when the prioritized device RL1 is driven, the driving of the other non-prioritized devices RL2 and RL3 is stopped, and when the prioritized device RL1 is stopped, the non-prioritized devices RL2 and RL3 are driven again.

That is, when the temperature of the shut-off device 6 exceeds a predetermined value, the drive controller 13b provides a time difference between the timings for starting and stopping the plurality of load devices 4a to 4c according to the priorities of the plurality of load devices 4a to 4c, the reduction characteristics of the drive currents upon starting the load devices 4*a* to 4*c*, and the current characteristics upon stopping the load devices 4*a* to 4*c*.

With this configuration, the peak current can be further suppressed, and the current to be supplied to the essential devices can be secured.

Figure 7:
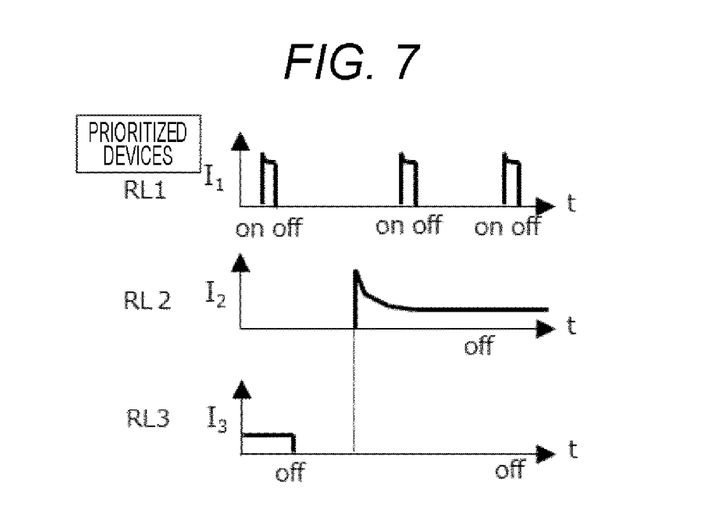
FIG. 7 is a diagram showing a more effective method for the operation timings of the load devices according to the first embodiment of the present invention.

A more effective method for securing the current of the power source of the essential devices will be described with reference to FIG. 7. FIG. 7 is an effective method in a case where the temperature of the shut-off device 6 rises further and the current that can be supplied is significantly reduced.

In FIG. 7, the load device RL2 is a device that cools a powertrain such as a vehicle engine, and the load device RL3 is an in-vehicle air conditioner. The device for cooling the powertrain is, for example, a fan motor of a radiator. When the temperature of the powertrain rises, the fan motor is driven to cool the powertrain. Because the temperature of the powertrain gradually rises, the temperature is easy to predict.

For this reason, when the temperature rise of the powertrain is predicted and a state where the fan motor is driven approaches, the other load device RL3 is shut off in advance, and the current flowing to the shut-off device 6 decreases, thereby reducing the temperature of the shut-off device 6. When the temperature of the shut-off device 6 is reduced, the current that can be supplied increases, and the current necessary for the fan motor which is the load device RL2 can be secured.

That is, in a case where the driving of an essential device can be predicted, the drive controller 13*b* calculates a future estimated startup timing of the load device for which the priority is high and stops the load device for which the priority is low before the estimated startup timing, and thus the temperature of the shut-off device 6 can be lowered in advance, and the current for driving the high-priority load device can be secured. As a result, even when the temperature of the shut-off device 6 rises further and the current that can be supplied is significantly reduced, the essential devices can be operated.

In the above method, the operation of non-essential devices is stopped when the essential devices are operating or in a case where operation thereof is expected, but a similar advantageous effect can be obtained by a method of restricting the current to be supplied without completely stopping the operation.

In addition, in the first embodiment, a configuration in which the startup timing of the plurality of load devices 4*a* to 4*c* is not restricted in a case where the temperature of the shut-off device 6 is low was described; however, a configuration may be adopted in which the drive timings of the prioritized devices and of the non-prioritized devices are staggered even at a low temperature, and restrictions on the startup timing are further tightened when a high temperature is reached. That is, the advantageous effect of the present invention can be similarly obtained even with a configuration in which the driving of the non-prioritized devices is restricted more than at a low temperature due to a rise in temperature of the shut-off device 6.

As described above, according to the first embodiment of the present invention, a vehicle control device using a semiconductor fuse can be realized, the vehicle control device enabling an increase in size of the semiconductor fuse to be suppressed and the occurrence of an abnormal current to be detected early to enable shut off of the abnormal current.

Second Embodiment

Figure 8:
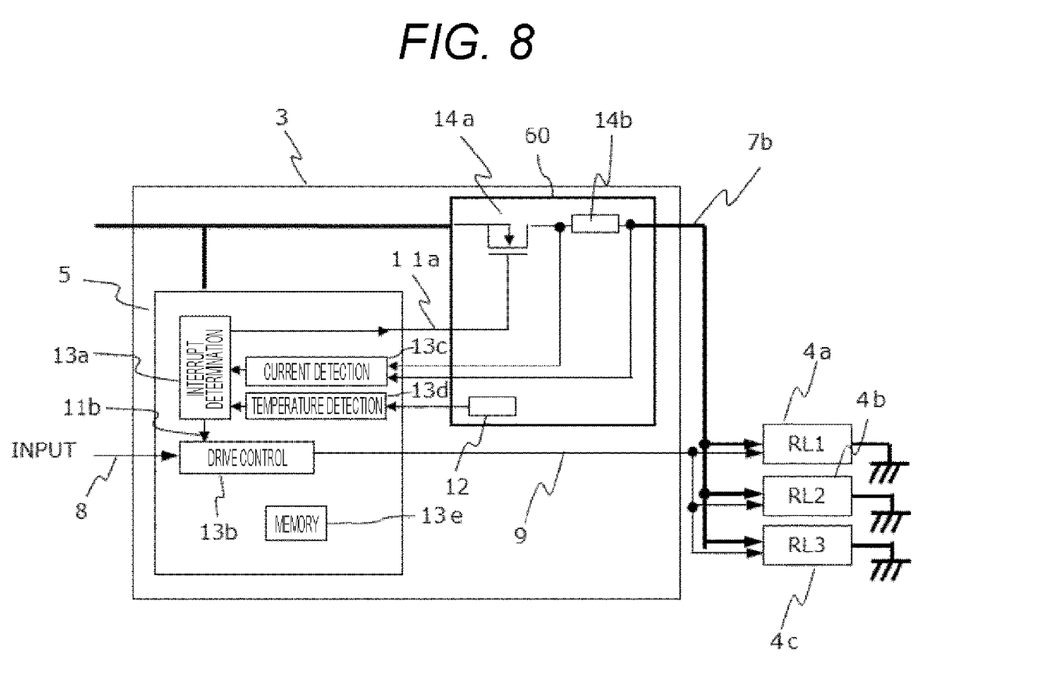
FIG. 8 is a diagram showing a configuration of a vehicle control device according to a second embodiment of the present invention.

In the first embodiment, a configuration in which a MOS transistor is utilized as the shut-off device 6 was described; however, in a second embodiment, a MOS transistor 14*a* and a shunt resistor 14*b* are used, as illustrated in FIG. 8. Other configurations are similar to those of the first embodiment.

The shut-off device 60 illustrated in FIG. 8 includes the MOS transistor 14*a*, through which a load current flows, and the shunt resistor 14*b*, which detects a current. The MOS transistor 14 and the shunt resistor 14 are connected in series, and thus the same load current flows therein. The gate terminal of the MOS transistor 14*a* is connected to the shut-off determination unit 13*a* of the arithmetic unit 5, and the gate signal 11*a* is supplied thereto. The shut-off determination unit 13*a* of the arithmetic unit uses the gate signal 11*a* to control the on/off of the MOS transistor 14*a*. The voltage across the shunt resistor 14*b* is inputted to the current detector 13*c* of the arithmetic unit 5. Because the voltage across the shunt resistor 14*b* changes according to the current, the load current can be detected.

In addition, a temperature sensor 12 that detects the temperature of the MOS transistor 14*a* is provided. In addition to a configuration in which the temperature sensor 12 is disposed on the same substrate adjacent to the MOS transistor 14*a*, the temperature sensor 12 may be built into the MOS transistor 14*a*. As the temperature sensor 12, a thermistor, a resistance temperature detector, or the like, can be used. The signal detected by the temperature sensor 12 is inputted to the temperature detector 13*d* of the arithmetic unit 5.

In the configuration illustrated in FIG. 8, an example in which there is one MOS transistor 14*a* is illustrated, but a configuration in which a plurality of MOS transistors are connected in parallel may be used. In this case, the gate signal 11*a* is supplied to the gate terminals of the plurality of MOS transistors.

In addition to affording an advantageous effect similar to that of the first embodiment, the second embodiment affords the advantageous effect that the shut-off device 60 can be configured using a low-cost element.

Third Embodiment

Figure 9:
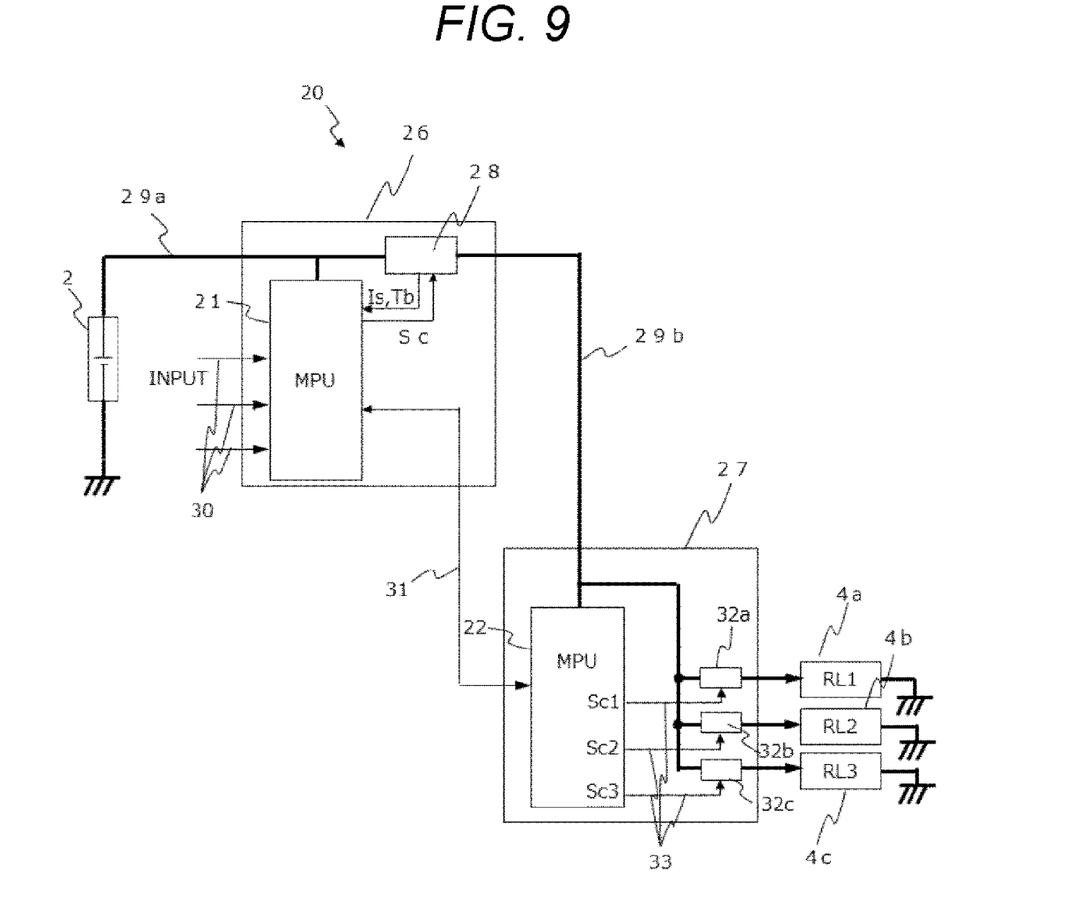
FIG. 9 is a diagram showing a configuration of a vehicle control device according to a third embodiment of the present invention.

FIG. 9 is a schematic configuration diagram of a power supply system 20 constituting a third embodiment to which the present invention is applied. The power supply system 20 is provided with a main unit 26 having a control function for managing the driving of the plurality of load devices 4*a* to 4*c*, and a subunit 27 that supplies power to the plurality of load devices 4*a* to 4*c*. The main unit 26 and the subunit 27 are the vehicle control device according to the third embodiment.

The main unit 26 includes an arithmetic unit 21, a shut-off device 28, a primary feeder line 29*a*, a secondary feeder line 29*b*, a control input line 30, and a communication line 31. The power of the battery 2 is supplied to the subunit 27 via the primary feeder line 29*a*, the shut-off device 28, and the secondary feeder line 29*b*. One end of the primary feeder line 29*a* is connected to the battery 2, while the other end is connected to the shut-off device 28. One end of the secondary feeder line 29*b* is connected to the shut-off device 28, while the other end is connected to the subunit 27.

The subunit 27 includes the arithmetic unit 22, switches 32*a* to 32*c*, the secondary feeder line 29*b*, the communication line 31, and a control output line 33. Power from the secondary feeder line 29*b* is supplied to the load devices 4*a* to 4*c* via the switches 32*a* and 32*b*. The secondary feeder line 29*b* is connected like a branch from one shut-off device 28 and is connected to the plurality of load devices 4*a* to 4*c*.

The main unit 26 is provided with an arithmetic unit 21, receives a control signal from the outside from the control input line 30, and outputs a drive command to the plurality of load devices 4a to 4c according to processing results inside the arithmetic unit 21. The output of the drive command is transmitted to the arithmetic unit 22 of the subunit 27 via the communication line 31. The arithmetic unit 21 includes a shut-off determination unit and a drive controller similar to the shut-off determination unit 13a and the drive controller 13b according to the first embodiment. As the communication line 31, a serial communication-type communication system such as CAN or LIN can be used. The shut-off device 28 can have the same configuration as the shut-off device 6 according to the first embodiment or the shut-off device 60 according to the second embodiment.

The arithmetic unit 22 provided in the subunit 27 controls the switches 32a to 32c that supply or shut off power to the load devices 4a and 4b according to the drive command received from the communication line 31. Therefore, the arithmetic unit 22 is also a drive controller. The on/off control of the switches 32a to 32c is transmitted via the control output line 33. The switches 32a to 32c are formed of semiconductor switches such as MOS transistors.

In the third embodiment, the drive controller included in the arithmetic unit 21 of the main unit 26 and the arithmetic unit 22 included in the subunit 27 control and restrict the drive of the drive controller load devices 4a to 4c. Thus, the main unit 26 can be defined as including a first drive controller and the subunit 27 as including a second drive controller. Further, the drive controller according to the third embodiment can be defined as having a first drive controller that outputs drive commands and a second drive controller that controls and restricts the operations of the load devices 4a to 4c according to the drive commands from the first drive controller.

In the above configuration, the arithmetic unit 21 of the main unit 26 receives the current value Is, which is based on the current flowing to the secondary feeder line 29b and the shut-off device temperature Tb, which is based on the temperature of the shut-off device 28. In addition, the arithmetic unit 21 estimates the overcurrent state from the current value Is and the shut-off device temperature Tb.

Upon determining that the current is in the overcurrent state, the arithmetic unit 21 outputs the shut-off signal Sc to the shut-off device 28, shuts off the shut-off device 28, and shuts off or restricts the current flowing to the secondary feeder line 29b.

The shut-off device 28 shuts off the current flowing from the battery 2 to the subunit 27 when the current reaches an abnormal value, and prevents the load devices 4a to 4c and the secondary feeder line 29b from emitting smoke, catching on fire, and failing due to a rise in temperature. The shut-off device 28 is formed of a semiconductor switch such as a MOS transistor.

In the third embodiment, the arithmetic unit 21 of the main unit 26 has the following functions disclosed in the first embodiment.

The arithmetic unit 21 has a memory 13e, stores, in the memory 13e, preset priority rankings (priorities) of the plurality of load devices 4a to 4b connected to the subunit 27, and restricts operations such as starting load devices having a lower priority ranking when the temperature of the shut-off device 28 exceeds a predetermined value.

Further, when the temperature of the shut-off device 28 exceeds a predetermined value, the shut-off threshold value calculated based on the current value and the time is set lower than that at a low temperature. The operation of the arithmetic unit 21 is similar to the operation of the arithmetic unit 5 disclosed in the first embodiment.

As a result, similarly to the first embodiment, the current flowing to the load devices 4a to 4c can be prevented from exceeding the allowable current of the shut-off device 28 even under a high temperature condition. At a high temperature, because the shut-off threshold value is set lower than that at a low temperature, an abnormal current can be detected and shut off early even in a case where the maximum current of the load devices 4a to 4c is low. That is, the optimum shut-off threshold value can be set by dynamically changing the shut-off threshold value according to the operation states of the plurality of load devices 4a to 4c, and thus an abnormal current can be detected and shut off early.

In the third embodiment, a configuration in which one subunit 27 is provided was described, but a plurality of subunits 27 may be connected to the secondary feeder line 29b and the communication line 31.

According to the third embodiment, in addition to advantageous effects like those of the first embodiment, in the case of the configuration including one main unit 26 and the plurality of subunits 27, the advantageous effect that the setting value of only the main unit 26 needs to be changed when the shut-off determination value or the like is changed can be obtained.

REFERENCE SIGNS LIST 1 power supply system
2 battery
3 communication unit
4a, 4b, 4c load device
5 arithmetic unit
6 shut-off device
7a primary feeder line
7b secondary feeder line
8 control input line
9 control output line
10a source MOSFET
10b sensing MOSFET
11a gate signal
11b determination value
12 temperature sensor
13a shut-off determination unit
13b drive controller
13c current detector
13c temperature detector
14 shut-off device
14a MOS transistor
14b shunt resistor
20 power supply system
21, 22 arithmetic unit
26 main unit
27 subunit
28 shut-off device
29a primary feeder line
29b secondary feeder line
30 control input line
31 communication line
32a to 32c switch
33 control output line

The invention claimed is:
1. A vehicle control device comprising:
a shut-off unit that supplies and shuts off a supply of power to a plurality of load devices;

a current detector that detects a current flowing to the plurality of load devices;

a temperature detector that detects a temperature of the shut-off unit; and a drive controller that, when the temperature of the shut-off unit detected by the temperature detector exceeds a predetermined value, controls and restricts operation of any of the plurality of load devices for which a priority is low, based on priorities set for each of the plurality of load devices, and wherein, when the temperature of the shut-off unit exceeds the predetermined value, the drive controller provides a time difference between startup timings of the plurality of load devices, based on a decreasing value of a drive current upon starting each of the plurality of load devices, and the priorities thereof.

2. The vehicle control device according to claim 1, wherein the shut-off unit has a first current shut-off threshold value for shutting off power to the plurality of load devices based on a current detection value detected by the current detector, and a second current shut-off threshold value smaller than the first current shut-off threshold value, wherein the first current shut-off threshold value is set when the temperature detected by the temperature detector is equal to or less than the predetermined value, and wherein the second current shut-off threshold value is set when the temperature exceeds the predetermined value.

3. The vehicle control device according to claim 1, wherein the shut-off unit has a semiconductor transistor, and wherein the temperature of the shut-off unit is the temperature of the semiconductor transistor.

4. The vehicle control device according to claim 1, wherein the priorities are changed according to a travel environment and a travel state of a vehicle.

5. The vehicle control device according to claim 1, wherein the shut-off unit has a semiconductor transistor, and a shunt resistor connected to the semiconductor transistor.

6. The vehicle control device according to claim 1, wherein the drive controller has a first drive controller that outputs a drive command, and a second drive controller that controls and restricts the operation of any of the plurality of load devices according to the drive command from the first drive controller, and the vehicle control device further comprises:
a main unit, which has the shut-off unit, the current detector, the temperature detector, and the first drive controller; and
a subunit, which has the second drive controller.

7. A vehicle control device comprising:
a shut-off unit that supplies and shuts off a supply of power to a plurality of load devices;
a current detector that detects a current flowing to the plurality of load devices;
a temperature detector that detects a temperature of the shut-off unit; and
a drive controller that, when the temperature of the shut-off unit detected by the temperature detector exceeds a predetermined value, controls and restricts operation of any of the plurality of load devices for which a priority is low, based on priorities set for each of the plurality of load devices, and
wherein, when the temperature of the shut-off unit exceeds the predetermined value, the drive controller provides a time difference between timings for starting and stopping the plurality of load devices according to the priorities of the plurality of load devices, a decreasing value of a drive current upon starting the plurality of load devices, and a current characteristic upon stopping the plurality of load devices.

8. The vehicle control device according to claim 7, wherein the shut-off unit has a first current shut-off threshold value for shutting off power to the plurality of load devices based on a current detection value detected by the current detector, and a second current shut-off threshold value smaller than the first current shut-off threshold value, wherein the first current shut-off threshold value is set when the temperature detected by the temperature detector is equal to or less than the predetermined value, and wherein the second current shut-off threshold value is set when the temperature exceeds the predetermined value.

9. The vehicle control device according to claim 7, wherein the shut-off unit has a semiconductor transistor, and wherein the temperature of the shut-off unit is the temperature of the semiconductor transistor.

10. The vehicle control device according to claim 7, wherein the priorities are changed according to a travel environment and a travel state of a vehicle.

11. A vehicle control device comprising:
a shut-off unit that supplies and shuts off a supply of power to a plurality of load devices;
a current detector that detects a current flowing to the plurality of load devices;
a temperature detector that detects a temperature of the shut-off unit; and
a drive controller that, when the temperature of the shut-off unit detected by the temperature detector exceeds a predetermined value, controls and restricts operation of any of the plurality of load devices for which a priority is low, based on priorities set for each of the plurality of load devices, and
wherein the drive controller calculates a future estimated startup timing of any of the plurality of load devices for which the priority is high, and stops any of the plurality of load devices for which the priority is low before the future estimated startup timing.

12. The vehicle control device according to claim 11, wherein the shut-off unit has a first current shut-off threshold value for shutting off power to the plurality of load devices based on a current detection value detected by the current detector, and a second current shut-off threshold value smaller than the first current shut-off threshold value, wherein the first current shut-off threshold value is set when the temperature detected by the temperature detector is equal to or less than the predetermined value, and wherein the second current shut-off threshold value is set when the temperature exceeds the predetermined value.

13. The vehicle control device according to claim 11, wherein the shut-off unit has a semiconductor transistor, and wherein the temperature of the shut-off unit is the temperature of the semiconductor transistor.

14. The vehicle control device according to claim 11, wherein the priorities are changed according to a travel environment and a travel state of a vehicle.

* * * * *